[19] United States Patent
Hardy

[11] 3,754,944
[45] Aug. 28, 1973

[54] LIQUID BOTTOM PLATE DRESSINGS
[75] Inventor: Trevor Hardy, Nechells, England
[73] Assignee: Foseco International Limited, Birmingham, England
[22] Filed: July 22, 1971
[21] Appl. No.: 165,317

Related U.S. Application Data
[63] Continuation-in-part of Ser. No. 29,642, April 17, 1970, abandoned.

[30] Foreign Application Priority Data
Dec. 8, 1969 Great Britain .................. 58,922/69
Dec. 8, 1969 Great Britain .................. 58,923/69

[52] U.S. Cl. ............. 106/38.27, 106/38.23, 117/5.3
[51] Int. Cl. ............................................. B28b 7/36
[58] Field of Search ................... 106/38.2, 38.22, 106/38.23, 38.27, 38.28; 117/5.1, 5.2, 5.3

[56] References Cited
UNITED STATES PATENTS
1,990,075   2/1935   Horak .............................. 106/38.27
2,289,681   7/1942   Projahn et al. .................. 106/38.27
2,491,096   12/1949  Feagin ............................ 106/38.27
2,499,729   3/1950   Daussan .......................... 106/38.27
2,521,839   12/1950  Feagin ............................... 117/5.2
3,211,560   10/1965  Fair ................................ 106/38.22
3,184,815   5/1965   Reuter ............................... 117/5.3

Primary Examiner—Lorenzo B. Hayes
Attorney—Wolfe, Hubbard, Leydig, Voit & Osann, Ltd.

[57] ABSTRACT

Liquid bottom plate dressings consist of water, a water soluble silicate and an MgO source, the proportion of MgO to silicate being sufficient to convert all the silicate to forsterite ($2MgO:SiO_2$), and the water being sufficient to dissolve all the silicate.

7 Claims, No Drawings

LIQUID BOTTOM PLATE DRESSINGS

CROSS REFERENCE TO RELATED APPLICATION

This application is a continuation-in-part of my application Ser. No. 29,642 filed Apr. 17, 1970, now abandoned.

This invention relates to liquid bottom plate dressings.

FIELD OF THE INVENTION

In the casting of molten metals such as steel to form ingots, molten metal is poured from a height into an ingot mould. Impacting molten metal at the commencement of pouring tends to erode the base areas of the mould, and in order to lower mould wear, it is customary to coat the base and in some cases the lower areas of the walls of the mould, with a refractory dressing. From their common use as coatings on ingot mould bottom plates, these dressings are known as bottom plate dressings, and are for simplicity referred to as such herein. It is, however, to be understood throughout that their use is not limited to application to bottom plates only, but they may be applied to the bases of big-end-up ingot moulds, and to the walls of ingot moulds, to prevent or minimise molten metal erosion.

DESCRIPTION OF PRIOR ART

Many types of dressing have previously been proposed in the past, but as is well known to those engaged in casting ingots, much room for improvement still remains. Generally, prior types of dressing consist of a particulate refractory such as silica or alumina, a binding agent and a liquid medium, usually water.

GENERAL DESCRIPTION OF INVENTION

I have now found that dressings of particular durability and giving enhanced protection may be formed by the use of a liquid coating composition which dries down to a coherent coating on the base or bottom plate of an ingot mould to give a material which, when first contacted by molten metal, reacts to form the highly refractory material Forsterite in situ on the base of the mould.

Forsterite is a highly refractory material of empirical formula $2MgO.SiO_2$, which melts at a temperature of about 1,890°C in the free state. This is about 200°C above the highest steelpouring temperatures. Forsterite occurs naturally in certain mineral materials (e.g., olivine) but I have found that merely using forsterite as a refractory filler does not give the improved protective results obtained when forming the forsterite in situ.

Thus, in order to form forsterite in situ, it is necessary to provide in the bottom plate dressings of this invention a source of MgO and a source of $SiO_2$ and to mix the two sources sufficiently intimately to ensure adequate reaction between them to form an effective amount of forsterite. In order to do this, I find it necessary to use as a source of $SiO_2$ a water-soluble silicate, and this enables me to produce a liquid dressing in which the $SiO_2$ is evenly distributed throughout the MgO, which I use in solid phase.

It is naturally necessary to exercise care in making up the liquid dressings of this invention, in order to ensure that the dressing, before application and drying down on the ingot mould base or bottom plate, will store adquately and will not, for example, gel, react or otherwise deteriorate. Thus, for example, it is not adviseable to use pure Magnesium oxide if the dressing is to be stored for any length of time. Pure MgO hydrates very rapidly and would accordingly be unsuitable for use. Further the source of $SiO_2$ should not be one which will react with the MgO source (usually alkaline in character) to form a gel. For this reason, colloidal silica and ethyl silicate do not prove to be satisfactory $SiO_2$ sources.

I thus prefer to use a water soluble alkali metal silicate, such as sodium silicate or potassium silicate, together with solid MgO, preferably in a form which does not easily hydrate.

I have found that the best results are obtained using calcined or deadburnt magnesite as the source of MgO. Magnestie is a naturally occurring mineral material which always contains a few percent by weight of impurity, but which consists predominantly of $MgCO_3$. On calcination or deadburning, usually at a temperature of at least 1,500°C for several hours, $CO_2$ is driven off and the calcined or deadburnt material so obtained is hydrateable only to a very limited extent, e.g., to an extent of only up to 3 or 4 percent of its own weight. The best results are obtained from magnesia, extracted from seawater and subsequently dead burnt.

In order to provide an adequately refractory coating on the bottom plate, it is necessary to ensure that all the $SiO_2$ is used up in the in situ forsterite formation and that none remains as free silica. This requires a certain minimum ratio of $MgO:SiO_2$ in the bottom plate dressing as applied, but it will be appreciated that, since the MgO is in solid granular form, not all of the MgO present in the dressing is available to take part in forsterite formation. The availability of MgO will depend in part on the particle size thereof, being greater as the particle size decreases. Accordingly, I prefer to use MgO of as small a particle size as possible, consistent with the maintenance of stable viscosity, preferably −150 or −200 US mesh proved to be best.

If desired, the bottom plate dressings of this invention may contain, in addition to the water soluble silicate and the MgO source, a proportion of a refractory filler which is inert or substantially inert to the first two ingredients. The use of an added inert filler, however, although advantageous in that it serves to lower the cost of the dressing, may have disadvantageous effects. The use of any inert filler may tend to exert a physical masking effect between the silicate and the MgO source, and thus decrease forsterite formation. In addition, there may be a tendency for some slight reaction between the filler and the silicate for example alumina and sodium silicate will react to form an aluminosilicate. If any such reaction occurs, then it is necessary to increase the silicate content of the dressing to maintain forsterite formation at the desired level, though this brings in its train the danger of leaving pockets of low-melting silicate in the final coating, which leads to a decrease in the refractoriness thereof.

In general, I have found that the most satisfactory liquid dressings of my invention consist of water, water-soluble alkali metal silicate, and magnesia, calcined magnesite or deadburnt magnesite in finely divided form. The preferred weight proportions lie in the ranges:

| | |
|---|---|
| water | 30 – 70 % |
| water-soluble alkali metal silicate (as solids) | 3 – 15 % |
| calcined magnesite, dead-burnt | |

| magnesite or magnesia | 30 – 60 % |

If an additional inert or substantially inert filler is present; it is preferred that it be present in an amount of at most 30 percent by weight. Fillers such as alumina, zircon, zirconia and titania may be used.

The dressings of this invention are freeely flowing liquids which may be applied to the desired site by any conventional method such as brush, swab or spray. Naturally the thicker the applied coating of dressing, the better the protection, but care should be taken to avoid too thick coatings for reasons of avoiding cracking, as well as those of economy. Generally, a preferred coating thickness, when the coating has dried to a layer of the solids ingredients containing at most only a few percent by weight of entrapped water, is 0.5 to 5 mm.

In use of the coatings, the first time molten metal is poured onto the coating, the forsterite-forming reaction takes place, and results in a refractory layer containing particles of MgO and of any inert refractory filler originally present, bonded together and to the ingot mould base of bottom plate, by a matrix of forsterite. The layer is free of low-melting material such as silica, and thus forms a highly resistant and protective coating. It is found in practice, that this coating will resist molten metal erosion for several casting cycles after its original application.

SPECIFIC EXAMPLES OF THE INVENTION

EXAMPLE 1

A bottom plate dressing was made up of (proportions by weight):

| | |
|---|---|
| Magnesia (deadburnt magnesite; 100% less than 0.075 mm) | 33.75% |
| Alumina (all less than 0.15 mm) | 11.25% |
| Liquid sodium silicate (SiO$_2$:Na$_2$O ratio 3.3:1, 37.9% solids, S.G.1.39) | 12.00% |
| Suspending agent (Xanthomonas colloid: Biopolymer XB 23, Melle-Bezons) | 0.15% |
| Water | 42.85% |

This was sprayed onto a heated cast iron slab, of dimensions 150 mm × 150 mm × 36 mm, and allowed to dry. Coating thickness was 2 mm. Thereafter the case iron slab was arranged with the coated face uppermost and in a plane at an angle of 45° to the horizontal. A stream of molten steel at 1,620°C was then poured onto the slab from a height of 45 cm at a rate of 2 kg of steel per second. After 90 seconds duration of pouring the steel had not penetrated the coating.

EXAMPLE 2

A bottom plate dressing was made up of (proportions by weight):

| | |
|---|---|
| Magnesia (deadburnt magnesite; 100% less than 0.075mm) | 45% |
| Sodium metasilicate .5H$_2$O (35% by weight aqueous solution) | 22.75% |
| suspending agent (As example 1) | 0.15% |
| water | 32.1% |

This was sprayed onto a heated cast iron slab (as used in Example 1) and allowed to dry. Coating thickness was 2 mm. Thereafter the cast iron slab was arranged with the coated face uppermost and in a plane at an angle of 45° to the horizontal. A stream of molten steel at 1,620°C was then poured onto the slab from a height of 45 cm at a rate of 2 kg of steel per second. After 90 seconds the plate was cooled and the exposed upper surface of the coating was polished, and placed under a microscope, and the crystal structure analysed by area to determine the relative proportions of the various refractory components present in that particular plane of observation.

Results were (% area of photo micrograph):

| | |
|---|---|
| Periclase (MgO) | 35% |
| Forsterite | 50% |
| Spinels, glasses and other silicates | 15% |

X-ray diffraction analysis of a quantity of the powdered coating residue indicated an overall Forsterite content, taken over the total coating thickness, of 6 to 8 percent.

I claim as my invention

1. A bottom plate dressing consisting essentially of water, a water soluble silicate and a source of MgO selected from the group consisting of calcined magnesite and dead-burnt magnesite, said magnesite being fired at a temperature of a least 1,500°C for a time sufficient to render it hydratable up to a maximum of 4 percent of its own weight, the relative proportions of MgO and silicate being such that enough MgO is available for reaction with all the SiO$_2$ present to form forsterite (2MgO.SiO$_2$), and the amount of water present being sufficient wholly to dissolve the water-soluble silicate.

2. A bottom plate dressing according to claim 1 wherein the relative weight proportions of the ingredients are in the following ranges

| | |
|---|---|
| water | 30 – 70 % |
| MgO source | 30 – 60 % |
| water-soluble silicate | 3 – 15 % |

3. A bottom plate dressing according to claim 1 wherein the water soluble silicate is selected from the class consisting of water soluble sodium silicates and water soluble potassium silicates.

4. A bottom plate dressing according to claim 2 which contains up to 30 percent by weight of a refractory filler selected from the class consisting of zircon, zirconia, titania and alumina.

5. In the process of protecting ingot mould bases and bottom plates from erosion by molten metal, the improvement which comprises applying to the surface a liquid coating composition consisting essentially of water, a water soluble silicate and a source of MgO selected from the group consisting of calcined magnesite and dead-burnt magnesite, said magnesite being fired at a temperature of at least 1,500°C for a time sufficient to render it hydratable up to a maximum of 4 percent of its own weight, the relative proportions of MgO and silicate being such that enough MgO is available for reaction with all the SiO$_2$ present to form forsterite (2MgO.SiO$_2$), and the amount of water present being sufficient wholly to dissolve the water-soluble silicate, and subsequently drying the applied coating.

6. The process of claim 5 wherein the substantially dry coating has a thickness of 0.5 to 5 mm.

7. The process of claim 5 wherein the applied coating is heated by pouring molten metal onto the coating.

* * * * *